United States Patent
Hooper et al.

(10) Patent No.: US 7,175,338 B2
(45) Date of Patent: Feb. 13, 2007

(54) STAND MIXER

(75) Inventors: Ryan Hooper, Greenwood, MS (US); Brent Bailey, Greenwood, MS (US)

(73) Assignee: Viking Range Corporation, Greenwood, MS (US)

( * ) Notice: Subject to any disclaimer, the term of this patent is extended or adjusted under 35 U.S.C. 154(b) by 139 days.

(21) Appl. No.: 10/663,086

(22) Filed: Sep. 16, 2003

(65) Prior Publication Data
US 2005/0058018 A1 Mar. 17, 2005

(51) Int. Cl.
*A47J 43/044* (2006.01)
(52) U.S. Cl. .................................... 366/197
(58) Field of Classification Search ............ 366/46–48, 366/185, 197, 200, 207, 348
See application file for complete search history.

(56) References Cited

U.S. PATENT DOCUMENTS

| | | | | |
|---|---|---|---|---|
| 2,137,547 A | * | 11/1938 | Snow | 366/207 |
| D149,176 S | | 4/1948 | Fleischmann | D14/3 |
| 2,662,753 A | * | 12/1953 | Schwarz | 366/200 |
| D196,638 S | | 10/1963 | Parker et al. | D14/3 |
| D235,371 S | | 6/1975 | Ponkey et al. | D55/1 |
| D237,901 S | | 12/1975 | Moran et al. | D55/1 |
| D246,715 S | | 12/1977 | Clement | D15/19 |
| 4,223,997 A | | 9/1980 | Violet et al. | 366/47 |
| 4,357,109 A | | 11/1982 | Blakeway | 366/55 |
| 4,671,666 A | | 6/1987 | Herfeld | 366/197 |
| 4,750,840 A | | 6/1988 | Bishop | 366/54 |
| 4,900,160 A | * | 2/1990 | Brooks et al. | 366/347 |
| 5,524,530 A | | 6/1996 | Nijzingh et al. | 99/492 |
| D387,610 S | | 12/1997 | Hippen et al. | D7/379 |
| D391,442 S | | 3/1998 | Sundquist | D7/378 |
| 5,809,872 A | | 9/1998 | Sundquist | 99/492 |
| 5,957,578 A | | 9/1999 | Holbrook et al. | 366/197 |
| 6,290,386 B1 | * | 9/2001 | Baumgartl et al. | 366/160.1 |
| D448,966 S | | 10/2001 | Hsieh | D7/376 |
| 6,367,963 B2 | | 4/2002 | Sanpei et al. | 366/233 |
| 6,435,708 B1 | | 8/2002 | Huang | 366/347 |
| 2001/0023642 A1 | | 9/2001 | Sanpei et al. | |

FOREIGN PATENT DOCUMENTS

DE 35 30 651 A1 3/1987
NZ 512632 6/2001

* cited by examiner

*Primary Examiner*—David Sorkin
(74) *Attorney, Agent, or Firm*—Womble Carlyle Sandridge & Rice, PLLC

(57) ABSTRACT

A stand mixer is provided with wheels proximate the base. The base houses a mixing bowl capable of being placed into a locked position. When the mixing bowl is in the locked position, its handle faces outward. The mixer can be lifted with the handle to transfer the weight of the stand mixer from the feet to the wheels. The stand mixer can then be moved into a desired position.

12 Claims, 7 Drawing Sheets

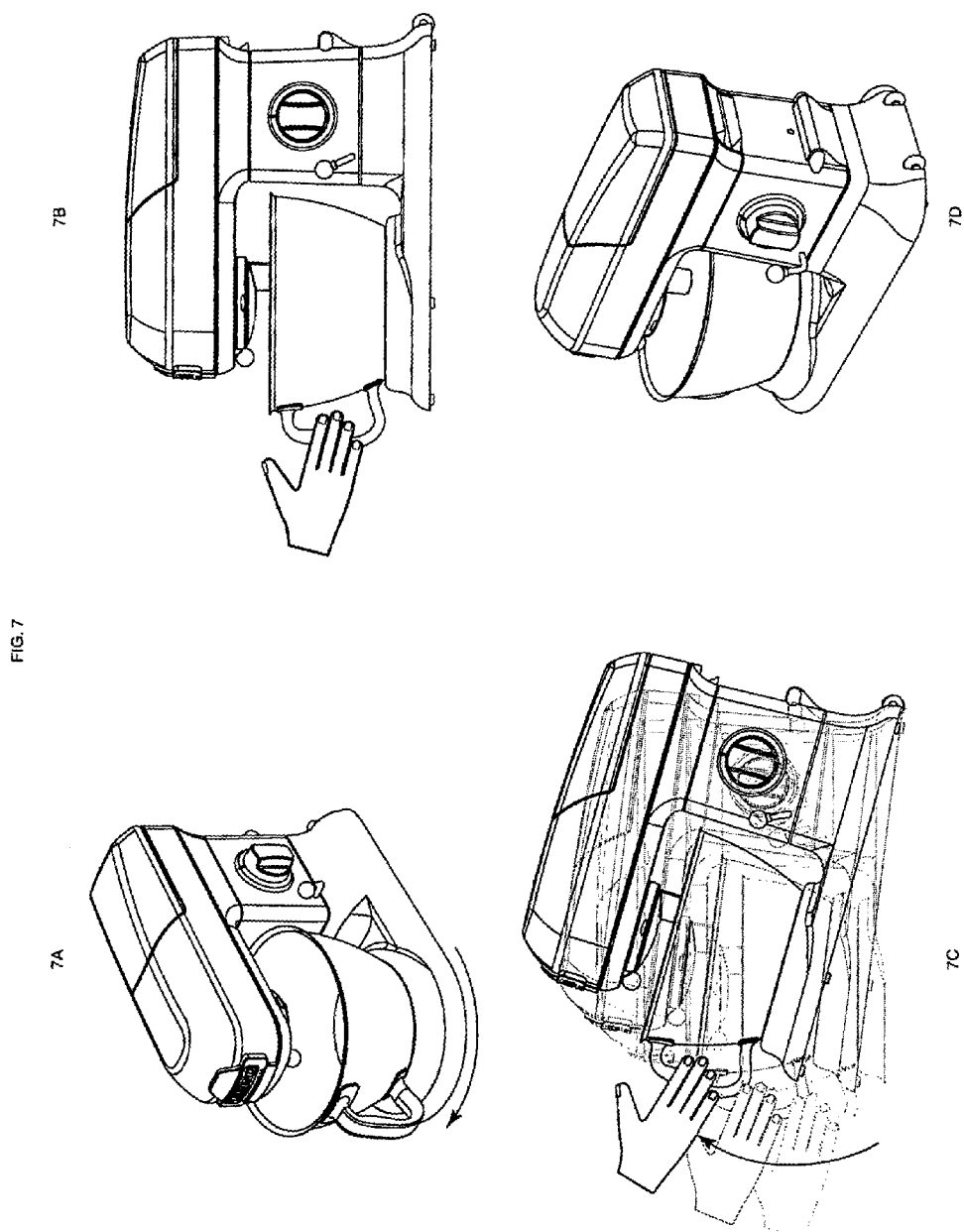

STAND MIXER

FIELD OF THE INVENTION

This invention relates to a stand mixer that can be moved by pivoting the base onto attached wheels by lifting a handle.

BACKGROUND OF THE INVENTION

Several types of mixers exist in the prior art that range from materials mixers, such as cement mixers, to food mixers.

Prior mixing devices have failed to provide an easily maneuverable mixer that rests on a stable base while in use or while idle, but that can be easily moved into a desired position through the engagement of wheels attached to the base. The prior art also fails to disclose a mixing apparatus that can be moved using a handle that has been locked into a secure position to allow a user to pivot the stand mixer onto the wheels for movement to a desired location.

SUMMARY OF THE INVENTION

This invention relates to a stand mixer with a base that houses a mixing bowl with a handle, that rests on feet, and that has wheels attached at a rear portion. The handle can be lifted to transfer the stand mixer from the feet to the wheels for movement to a desired position.

In addition to other benefits provided, the stand mixer disclosed herein makes up for the shortcomings in the art as discussed above. The stand mixer provides a mixing apparatus that has enough mass to remain in position during operation, yet that is portable enough to be easily moved into a desired position.

To these ends, the stand mixer described herein includes feet upon which the mixing apparatus securely rests during operation or when idle. In order to make the stand mixer easy to move, wheels have been included on the base of the machine. Since the wheels are typically not in contact with the surface when the stand mixer is in use or when the stand mixer is idle, the feet are typically provided to be of a specific depth. The wheels are engaged by lifting the handle with an upward force to dislodge the feet in a pivoting motion away from the surface upon which the stand mixer resides. The wheels are engaged and allow the stand mixer to be rolled into a desired location.

In order to facilitate the movement of the stand mixer with the handle, the mixing bowl is placed into a locked position. In the locked position, the mixing bowl is securely locked into the base with the handle facing outward. The handle is then simply lifted by the user to transfer the stand mixer's weight from the front and rear feet to the wheels to be maneuvered as desired.

The stand mixer typically comprises a body including a base with attachment means capable of receiving a bowl with a handle and at least one wheel positioned on a lower portion of the base. The handle of the stand mixer can be lifted to engage the at least one wheel for movement of the stand mixer.

In order to move the stand mixer described herein, a handle is attached to the base of the body of the stand mixer and at least one wheel is positioned on a lower portion of the base. The handle is capable of being lifted to engage the at least one wheel for movement of the stand mixer by locking the bowl into the base and then lifting the handle to engage the wheels.

BRIEF DESCRIPTION OF THE DRAWINGS

FIGS. 7A–7D are a graphical representation of the wheel movement of the stand mixer.

DESCRIPTION OF THE INVENTION

Figure 1:
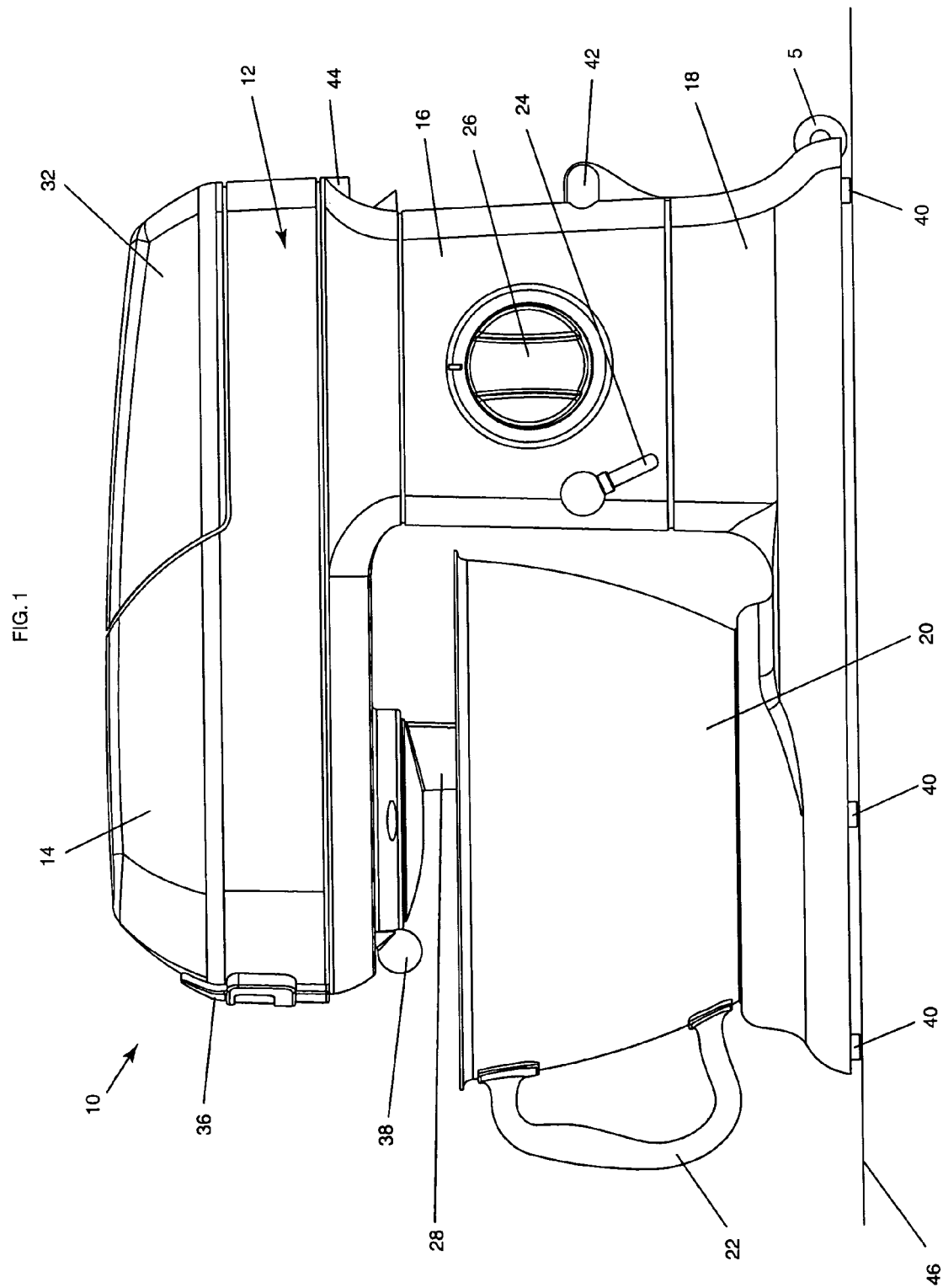
FIG. 1 is a right side view of the stand mixer.
Figure 2:
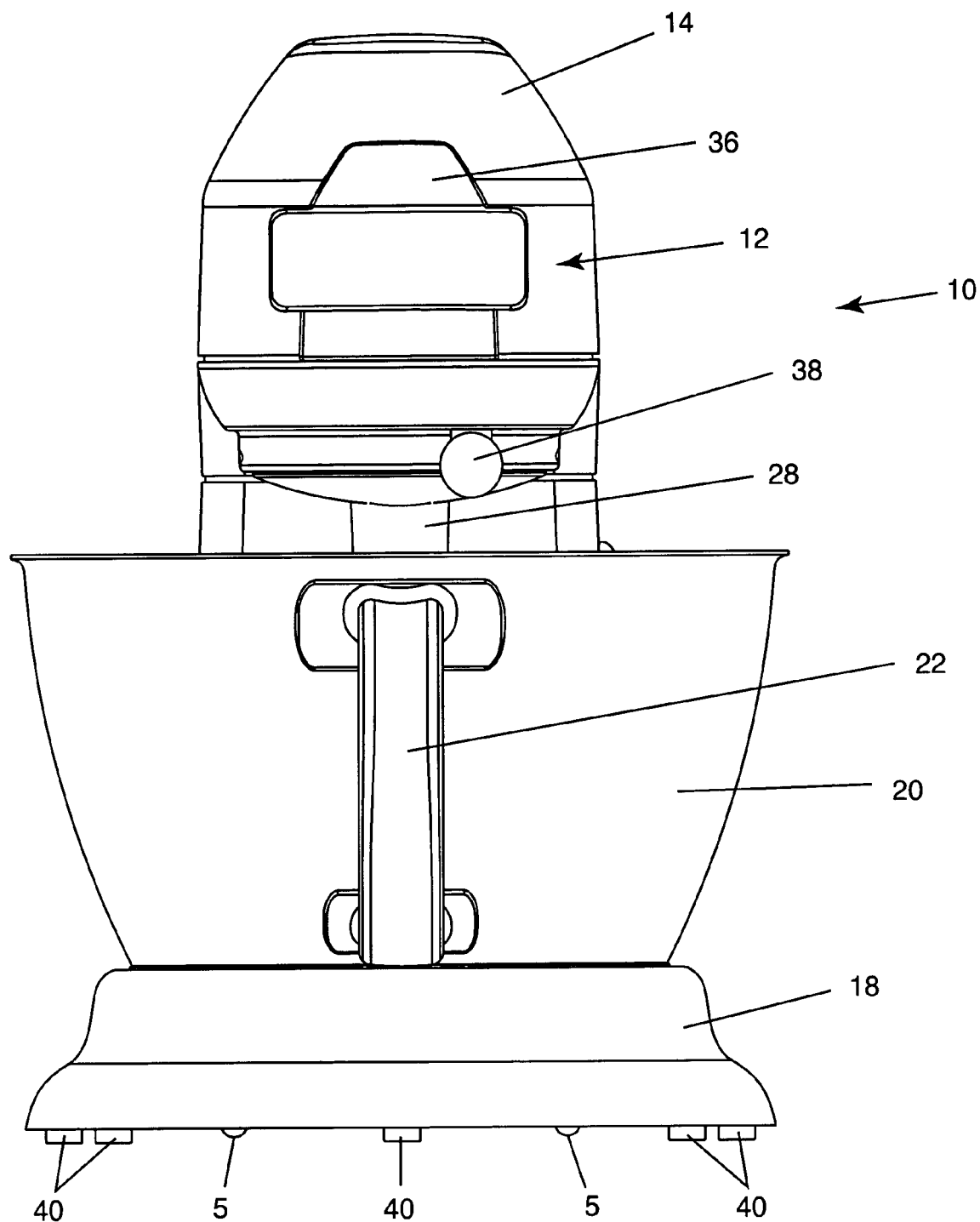
FIG. 2 is a front view of the stand mixer.

FIGS. 1–5 show various views of a stand mixer 10. The stand mixer 10 includes a body 12, a head 14, a motor housing 16, and a base 18. The stand mixer 10 rests on a surface 46 as shown in FIG. 1. Although the various elements of the body 12 could be formed as an integral unit, typically, the head 14, motor housing 16, and base 18 are separately formed and are securely affixed together. The base 18 can receive and house a bowl 20 with a handle 22 disposed thereon. The bowl 20 and handle 22 are typically formed of stainless steel, but could be formed of any other durable alternative. The handle 22 of the bowl 20 can be integrally formed as a part of the bowl or can be formed separately and affixed securely thereto through welding or any other method that would ensure a secure attachment. The bowl 20 is attached to the base 18 by placing the bowl 20 into the pre-cut slots and turning the bowl 20 clockwise to lock into the base 18. When the bowl 20 is in the locked position, the handle 22 typically will protrude from the front of the stand mixer 10 at a point fairly centrally located on a midpoint axis of the stand mixer 10. When the bowl 20 is in the unlocked position, the handle 22 typically will not be disposed fairly centrally located on the midpoint axis of the stand mixer 10. The locked position could also be indicated by an audible indication to give notice to the user that the bowl 20 and handle are locked correctly.

The head 14 of the body 12 includes a top and a bottom portion and typically houses an accessory slot 28 affixed to the bottom portion. The accessory socket 28 is capable of receiving various attachments or accessories (not shown) to facilitate mixing in the bowl 20. The attachments or accessories can include "V" beaters, whips, dough hooks, etc. and are typically formed of polished stainless steel, but could be formed of plastic, aluminum, or any other durable alternative. The attachments or accessories can be removably secured to the accessory socket 28 by any known method of attaching for mixing. When the desired attachment or accessory is secured to the accessory socket 28, the stand mixer 10 can then operate to mix the contents of the bowl 20. The stand mixer 10 drives the desired attachment or accessory under the power of a motor (not shown) housed in motor housing 16. The motor is typically disposed in the motor housing 16, but could be disposed in either the base 18 or the head 14. The motor is capable of several speeds, including low, intermediate, and high speeds and in a preferred embodiment operates up to 1000 watts for a seven quart mixing bowl and up to 800 watts for a five quart mixing bowl. Once attached to the accessory socket 28, the attachment or accessory can then be used in the bowl 20 to stir, mix, beat, cream, whip, pulse, etc. as desired. Each speed is typically utilized for different mixed ingredients, to prepare specific combinations of mixtures, or for different attachment accessories. The speed of the motor is controlled a power control knob 26 that is typically housed on the motor housing 16 of the body 12. The power control knob 26 can be turned to select the desired speed.

Figure 3:
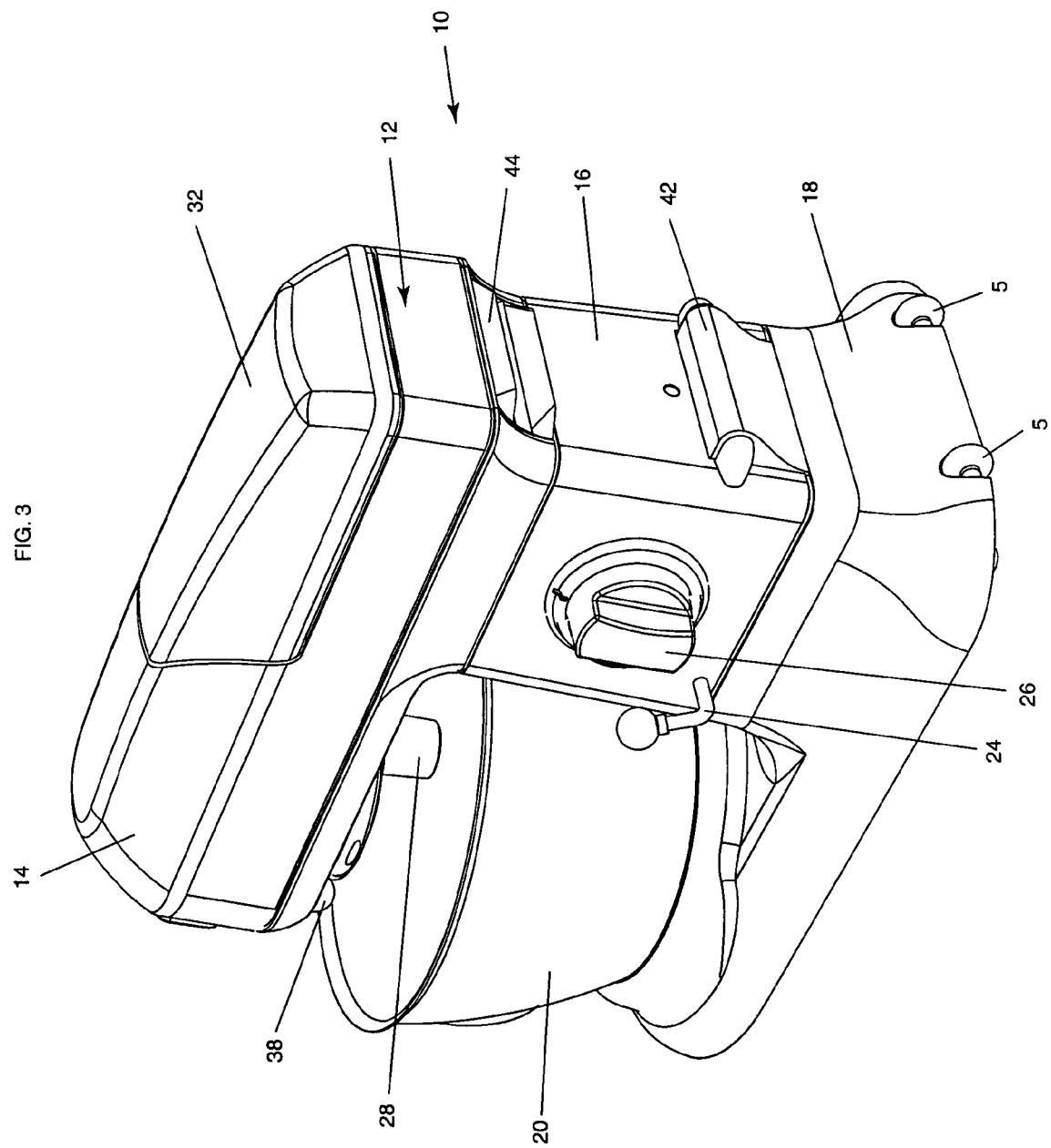
FIG. 3 is a back perspective view of the stand mixer.
Figure 4:
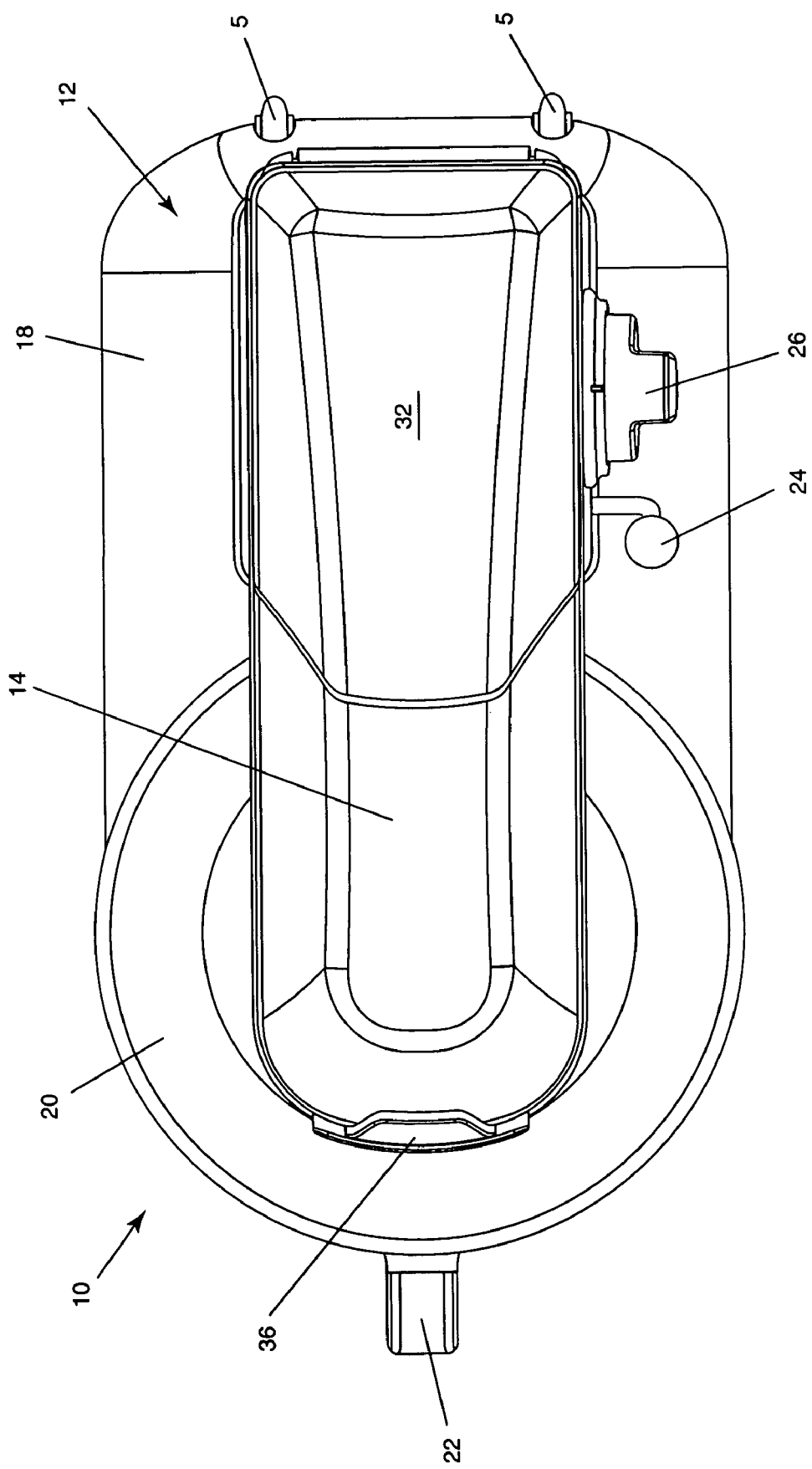
FIG. 4 is a top view of the stand mixer.

To facilitate attachment of the accessories onto the accessory socket 28, the head 14 is capable of being pivoted out of the mixing position. Although the head 14 could alternatively be lifted vertically above the bowl 20 or although the bowl 20 could be lowered away from the head 14, the stand mixer 10 will typically pivot the head 14 out of the bowl 20 through the use of a pivot mechanism 42. In FIGS. 1 and 3, the pivot mechanism 42 is shown on the back side of the motor housing 16, but could be attached anywhere along the back of the stand mixer 10 that will allow the head 14 to pivot out of the bowl 20. As shown herein, the head 14 pivots about the pivot mechanism 42 through the operation of a release lever 24. The actuation of the release lever 24 will release the secure hold of a catch (not shown) disposed between the head 14 and the motor housing 16. The catch is typically disposed in the front side of the housing 16 and will allow the head 14 to pivot in an upward direction toward the back of the stand mixer 10 about the pivot mechanism 42. When the head 14 has been pivoted fully, the stand mixer 10 will typically lock into an upward position at which time a user can access the accessory socket 28, the attachment accessories, or the bowl 20.

The back of the stand mixer 10 can also include at least one louver 44 as shown in FIGS. 1 and 3. The louvers 44 are provided for heat exhaust from the motor operation. The louvers 44 are typically formed of chrome, but could be formed of any material as desired.

Figure 5:
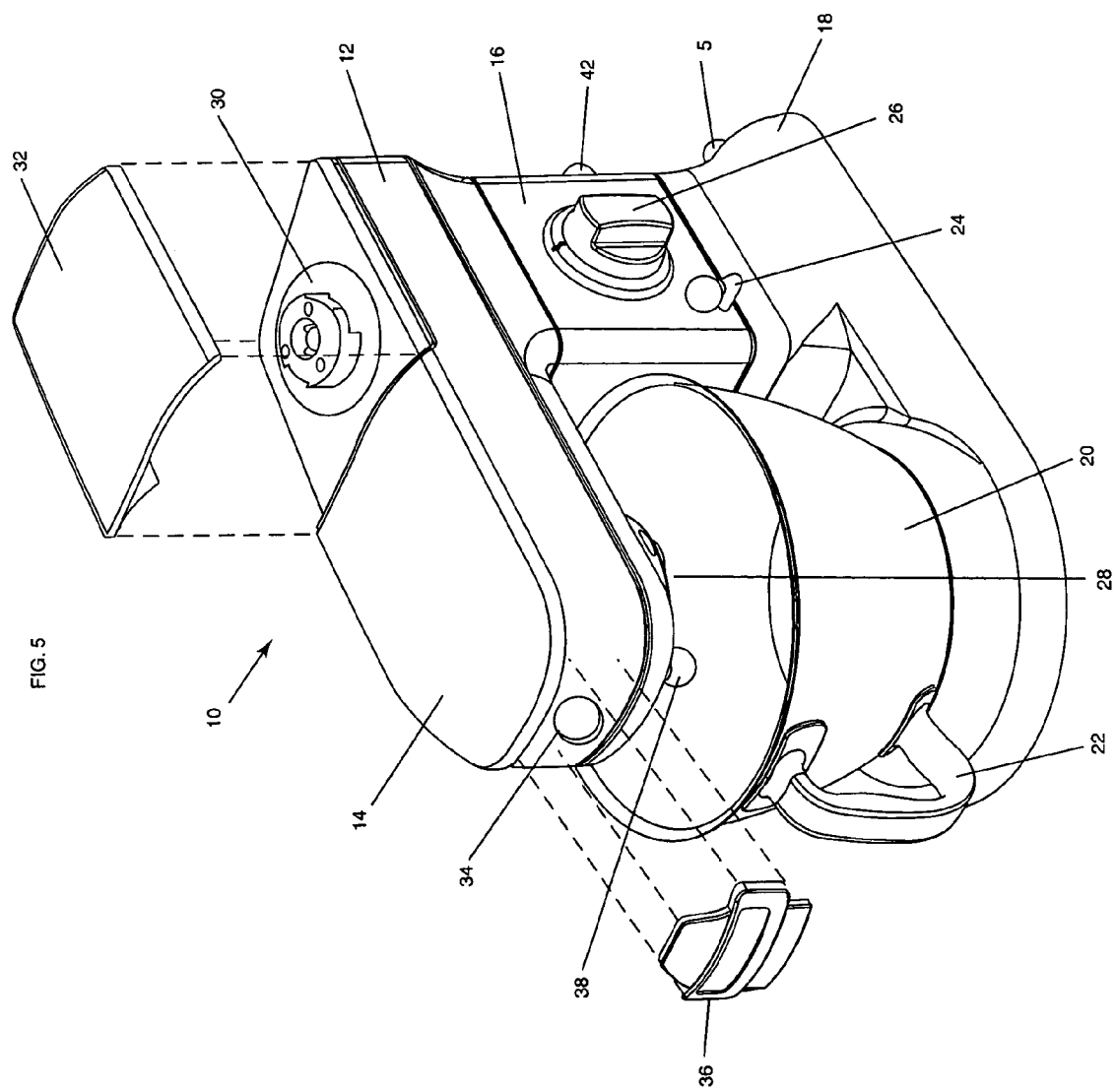
FIG. 5 is an exploded view of the stand mixer.

As illustrated in FIG. 5, the head 14 of the body 12 can also include a high-speed attachment outlet 30. The high-speed attachment outlet 30 allows use of additional attachments and accessories (not shown) through operation of the motor of the stand mixer 10 controlled by the power control knob 26. The high-speed attachment outlet 30 is typically covered by a high-speed attachment outlet cover 32 when the high-speed attachment outlet 30 is not in use. Although the high-speed attachment outlet 30 and high-speed attachment outlet 32 are shown disposed on the upper, back side of the head 14, the high-speed attachment outlet 30 and cover 32 could be disposed anywhere on the body 12 that would allow use of the optional attachments and accessories. The high-speed attachment outlet cover 32 is connectable to the head 14 through any connection method that allows secure attachment thereto and that covers the high-speed attachment outlet 30.

As further illustrated in FIG. 5, the head 14 can also house a slow-speed attachment outlet 34 that is capable of receiving optional attachments and accessories for operation by the motor under control of the power control knob 26. The slow-speed attachment outlet 34 is typically covered by a slow-speed attachment outlet 36 and is shown disposed on the front of the head 14 of the body 12. However, the slow-speed attachment outlet 34 and cover 36 could be disposed anywhere on the body 12 that would allow functional use thereof. The slow-speed attachment outlet cover 36 can be attached or detached from the head 14 of the body 12 through the use of a slow-speed attachment outlet cover release 38. The cover release 38 is shown disposed near the accessory socket 28 but also could be housed anywhere on the body 12. In operation, the cover release 38 is actuated to permit the outlet cover 36 to be removed from the head 14. Once the cover release 38 is actuated and the outlet cover 36 is removed, the slow-speed attachment outlet 34 can receive the optional accessories or attachment for use thereof under the power of the motor through the power control knob 26.

The base 18 typically rests on feet 40 that are disposed along the bottom of the base 18 to engage the surface upon which the stand mixer 10 resides. The feet 40 are typically formed of rubber, but could be formed of an elastomeric material, of plastic, or of any material that allows the stand mixer 10 to remain in place during use of motor or when the stand mixer is idle in a standby position. The feet 40 are disposed in any desired position along the bottom of the base 18 and are shown in the figures with five feet, two in the back and three in the front. The feet are deep enough to keep the base 18 of the stand mixer 10 off any surface upon which it resides. Alternatively, the lower portion of the base 18 could be formed of a plastic or other material and perform the function of the feet 40 described above.

The stand mixer 10 includes at least one wheel 5. In an exemplary embodiment as shown in the figures, two wheels 5 are provided and are disposed on the back side of and bottom of the base 18. As shown in FIG. 1, the wheels 5 are sized and positioned so that they do not contact the surface upon which the stand mixer 10 resides during operation or when not in use. Typically, the wheels 5 will project slightly from the base 18 and will allow a user to pivot the stand mixer 10 from the feet 40 onto the wheels 5 for movement into a desired position. The wheels 5 are typically housed close enough to the surface to allow a user to dislodge the feet 40 from the surface under the front of the stand mixer 10 and fairly immediately contact the surface with the wheels 5. Alternatively, the base 18 of the stand mixer 10 could omit the feet 40 and contact the surface directly. The wheels 5 would not contact the surface until the stand mixer 10 is pivoted for movement thereof.

Figure 6:
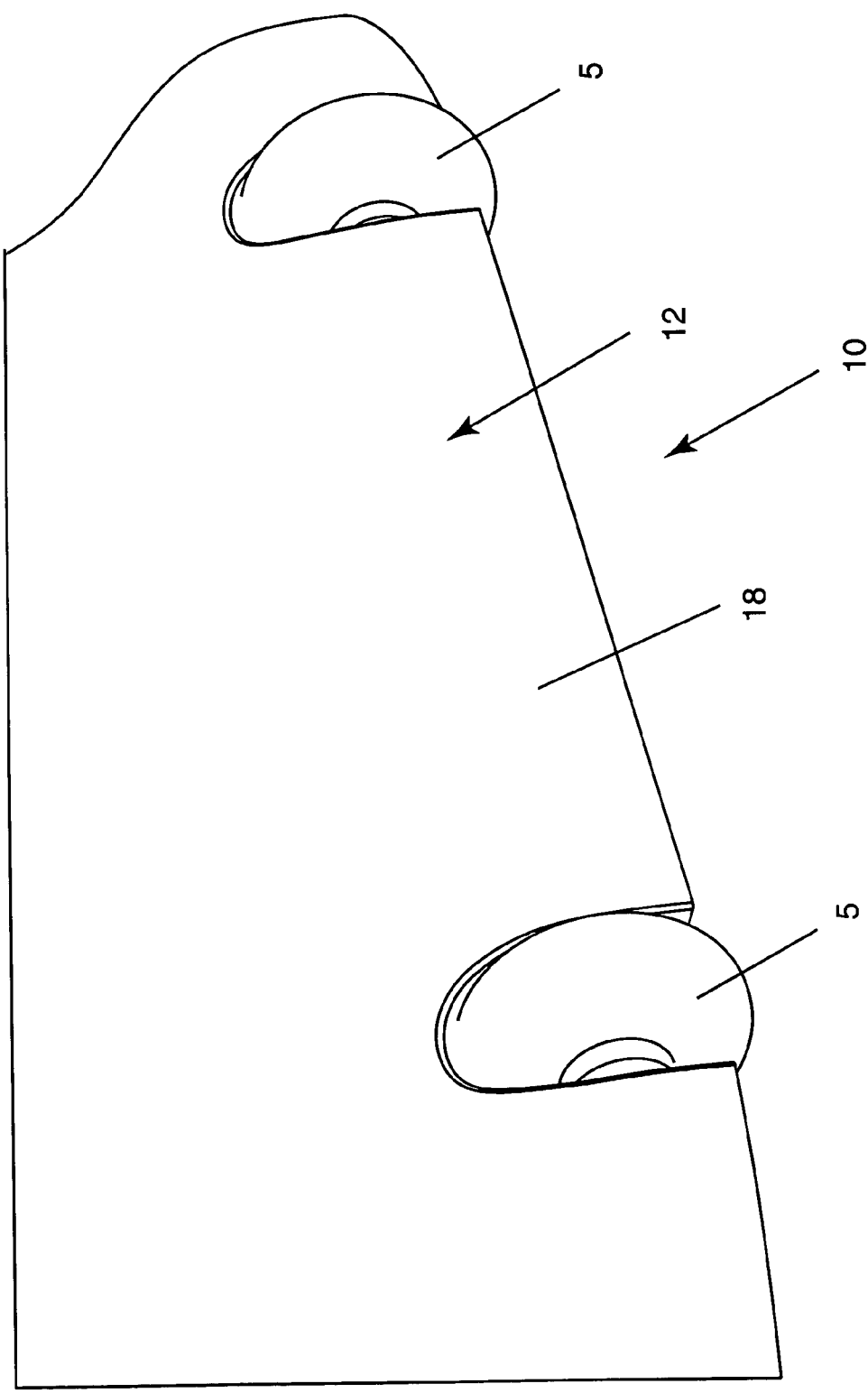
FIG. 6 is an enlargement of the wheels of the stand mixer.

The wheels 5 are shown in detail in FIG. 6. The wheels 5 are typically formed of plastic, of an elastomeric, of rubber, or of any material that will allow the wheels to grip the surface upon which the stand mixer 10 resides without slippage and that will support the weight of the stand mixer 10 when the wheels 5 are being utilized. The wheels 5 can be of any number or shape as long as they perform the functions described herein. For instance, a single wheel, cylindrical or spherical in shape, or any multiple number of wheels could be used in place of wheels 5 as shown in FIG. 6 in the exemplary embodiment. Alternatively still, the wheels 5 could be a separate attachment to the stand mixer 10 and could be secured thereto before use. The present wheel design is not meant to be limiting and should be interpreted to encompass a wheel or plurality of wheels, formed of any material or materials, with any texture or tread, disposed on an exterior surface, hidden in any manner during use, hidden during standby or mixing and disposed on an exterior surface when rolling is desired, that is movable in the process described herein on a surface of any shape or size.

The wheeled movement of the stand mixer 10 is described with specific reference to FIGS. 7A–7D. A user will begin at step one (FIG. 7A) by locking the bowl 20 in place. This locking is typically accomplished through rotation of the handle 22, but could be performed through rotation of the bowl 20. A user will note that the locked position places the handle 22 of the bowl 20 fairly centrally aligned with the midpoint of the stand mixer 10. Once the bowl is locked into the base 18 with the handle 22 disposed on the front portion of the stand mixer 10, a user grasps the handle 22 as shown in step 2 (FIG. 7B).

In step 3 (FIG. 7C), the user lifts the stand mixer 10 with the handle 22 onto the wheels 5. As the front of the stand mixer 10 proceeds upward from the surface upon which it resides, the feet 40 of the base 18 are lifted off the surface and the wheels 5 engage the surface. The handle 22 is moved in the direction shown by the arrow in step 3 of FIG. 7C to pivot the stand mixer 10 onto the wheels 5. The stand mixer 10 can then be rolled using the wheels 5 into a desired position as shown in step 4 (FIG. 7D).

When the user is satisfied that the desired position has been reached, the stand mixer 10 is then pivoted in a direction reverse to the arrow shown in step 3. This reverse pivoting returns the stand mixer 10 to the surface for mixing or for storage by placing the stand mixer 10 onto the feet 40 and dislodging the wheels 5 from engagement with the surface.

During upward pivoting of the stand mixer 10 using the handle 22, the wheels 5 will typically engage the surface before all of the feet 40 have cleared the surface upon which the stand mixer 10 resides. Thus, movement of the stand mixer 10 into position could be accomplished with the wheels 5 engaged and at least one of the feet 40 still in contact with the surface. However, in the exemplary embodiment, the user will find that complete disengagement of the feet 40 from the surface, by fully pivoting the stand mixer 10 onto the wheels 5 and off of the feet 40, will facilitate easier movement of the stand mixer 10 into the desired position using the wheels 5.

If the user desires to again move the stand mixer after completion of the movement process detailed above, the user will simply repeat the steps of the process shown in FIGS. 7A–7D to place the stand mixer 10 into a new desired position.

The stand mixer 10 of the preferred embodiment is typically formed of zinc and aluminum die castings, but could be formed of stainless steel or of any material with enough mass to bear upon the feet 40 for secure contact of the surface upon which the stand mixer 10 resides in order to perform the required mixing functions. With enough mass, the stand mixer 10 is able to engage the feet 40 securely onto the surface and withstand any movement of the stand mixer 10 that could be caused by use of the motor.

In an alternative embodiment and in lieu of, or in addition to, placement of the handle 22 on the bowl 20, the stand mixer could have a body handle attached to, or integrally formed as a part of, the head 14 or the base 18. In such an embodiment, the body handle either could be positioned on the top surface or a side surface of the head 14, or could be positioned in place of the slow-speed attachment, which could be omitted or repositioned elsewhere on the stand mixer, or could be placed on a front portion of the base 18. The body handle in this embodiment would function as described in the exemplary embodiment above, with the handle 22 resident on the bowl 20, to position the mixer by lifting on the body handle to place the wheels in contact with the surface for movement of the stand mixer. However, this embodiment could omit the step of securing the body handle into a locked position since the body handle would not be removable from the stand mixer.

Alternatively still, the body 12 of the stand mixer 10 could include a rear handle (not shown) that could be utilized by a user for ease in placement of the stand mixer 10 onto a desired surface, such as a countertop or table. Although the rear handle would typically be formed as an integral member of the body 12 and could be placed anywhere thereupon to allow placement of the stand mixer 10, the rear handle could be detachable/attachable from, but secured to the body.

The above embodiments are only used to illustrate the stand mixer and are not intended to limit its scope thereof. Many modifications of the stand mixer can be made without departing from the spirit of present disclosure.

We claim:

1. A method of moving a stand mixer, wherein the stand mixer includes a body having a base and a head, the base including a front base portion and a rear base portion and the head including a front head portion and a rear head portion, the base including attachment means capable of receiving a removably detachable bowl; the bowl including a handle; the handle being positioned below the front head portion when the bowl is attached to the attachment means; at least one wheel positioned adjacent the rear base portion, and wherein the handle can be lifted upwardly to engage the at least one wheel for movement of the stand mixer, the method comprising:

attaching the bowl to the base at the attachment means;

lifting the handle upwardly in a direction toward the front head portion to engage the at least one wheel.

2. The method of moving a stand mixer of claim 1, wherein the base includes at least one foot that is disengaged when the handle is lifted.

3. The method of moving a stand mixer of claim 1, further comprising:

maneuvering the stand mixer into a desired position.

4. The method of moving a stand mixer of claim 3, further comprising:

disengaging the at least one wheel by lowering the handle until the stand mixer rests fully upon the base.

5. The method of moving a stand mixer of claim 1, wherein when the base is fully in contact with a surface, the at least one wheel is not in contact with the surface.

6. The method of moving a stand mixer of claim 1 wherein attaching the bowl to the base at the attachment means further includes:

locking the bowl into the base.

7. A method of moving a stand mixer, wherein the stand mixer includes a body having a base and a head, the base including a front base portion and a rear base portion and the head including a front head portion and a rear head portion, the base including attachment means capable of receiving a removably detachable bowl; the base including a handle; the handle being positioned at the front base portion; at least one wheel positioned adjacent the rear base portion, and wherein the handle can be lifted upwardly to engage the at least one wheel for movement of a stand mixer, the method comprising:

attaching the bowl to the base at the attachment means; and lifting the handle upwardly in a direction toward the front head portion to engage the at least one wheel.

8. A method of moving a stand mixer, wherein the stand mixer includes a body having a base and a head, the base including a front base portion and a rear base portion and the head including a head portion and a rear head portion, the base including attachment means capable of receiving a removably detachable bowl; the head including a handle positioned on the head portion; at least one wheel positioned adjacent the rear base portion; and wherein the handle can be lifted upwardly to engage the at least one wheel for movement of a stand mixer, the method comprising:

attaching the bowl to the base at the attachment means; and lifting the handle upwardly to engage the at least one wheel.

9. The method of claim 8 wherein the handle is disposed on a top surface of the head portion.

10. The method of claim 8 wherein the handle is disposed on a side surface of the head portion.

11. The method of claim 8 wherein the handle is disposed on a front attachment surface of the head portion.

12. The method of claim 8 including a rear handle.

* * * * *